United States Patent Office 2,817,643
Patented Dec. 24, 1957

2,817,643

MIXED POLYURETHANE LACQUER AND METHOD OF COATING THEREWITH

Wilhelm Altner, Opladen, Germany, assignor to Farbenfabriken Bayer Aktiengesellschaft, Leverkusen, Germany, a corporation of Germany No Drawing. Application September 15, 1955
Serial No. 534,615

9 Claims. (Cl. 260—42)

This invention relates to novel stoving lacquers and to a process for preparing surface coatings therefrom.

The terms "soluble" and "insoluble" as used in the present specification and the appended claims refer to solubility and insolubility in conventional lacquer solvents.

It is known that insoluble linear polyurethanes are very resistant to the action of a wide variety of chemicals; they are also stable to boiling and possess excellent mechanical properties. It has, therefore, been proposed to use insoluble linear polyurethanes for purposes of surface protection.

However, there does not exist a satisfactory process for preparing surface coatings from insoluble polyurethanes. Thus, the so-called flame-spraying method, in which the finely divided polymers must be conducted through the flame of the flame-spraying gun in order to be applied to the surface being coated, causes damage to the insoluble polyurethanes which are very susceptible to oxidation at high temperatures. On the other hand, when applying a suspension prepared from an insoluble polyurethane to the surface to be coated by dipping or spraying followed, after drying, by melting at suitable temperatures so as to form a uniform protective layer, the articles treated with the plastic dispersion and then dried are very sensitive before stoving since the particles merely lie on the surface without any binder uniting them thereto. Moreover, coatings of this type tend to form pores because of poor flow and to crack on cooling. These disadvantages may partly be overcome by adding a suitable film-forming or plasticizing substance to the dispersible or dispersed polyurethane, but such additives are not always compatible with the polyurethanes and produce composite coatings which are considerably weaker than those of the pure polymers.

It is an object of the present invention to provide new stoving lacquers based on linear polyurethanes. Another object is to provide stoving lacquers which may easily be utilized for purposes of surface protection. A further object is to provide a process for preparing surface coatings from the stoving lacquers of the invention. Still further objects will appear hereinafter.

It has now been found that stoving lacquers containing small amounts of a soluble linear polyurethane in addition to an insoluble linear polyurethane are highly suitable for the production of surface coatings.

The soluble polyurethanes dissolved in the stoving lacquers of the invention act as binding agents as well as plasticizers. After the dispersion has been sprayed onto a support, the soluble polyurethanes form a skin-like adhering layer which anchors the dispersed plastic particles so firmly to the support that the dried articles substantially lose their sensitivity to vibrations, air, and contact, a property of great importance during transport of the articles to the stoving ovens. The thin layer of soluble polyurethanes used as a binding agent in accordance with the invention assists the flowing capacity of the insoluble polyurethane particles during the stoving since the entire surface to be protected is already coated with a plastic film prior to baking. Finally the soluble polyurethanes distributed throughout the entire surface layer during the stoving process also act as a plasticizer so that films which are prepared in this manner are more elastic and do not show any tendency to crack.

In a preferred embodiment of the invention, dispersions containing about 15 to 40% by weight of suspended insoluble linear polyurethane and 1 to 20% by weight of dissolved soluble linear polyurethane, based on the weight of the entire dispersion, are used as stoving lacquers. These concentrations may be altered if desired, but the sensitivity of the unbaked articles will increase when the concentration of the soluble polyurethanes is too low, while the properties of the insoluble polyurethanes forming the coating will approach those of the soluble polyurethanes when the concentration of the latter is too high.

As soluble polyurethanes there may be used all polyurethanes which form stable solutions at room temperature, melt at a temperature not higher, but preferably somewhat lower, than the melting point of the insoluble polyurethanes, are miscible with the latter, and finally possess a certain degree of softness.

In general, soluble polyurethanes contain hetero-atoms in their carbon chain, e. g. —O— and $N(CH_3)_2$— groupings, or side chains are attached, e. g. $CH_3$— and —$COOCH_3$ groups. Soluble polyurethanes may be prepared, inter alia, from hexamethylene diisocyanate or tetramethylene diisocyanate, and 1,3-butanediol or 2,5-hexanediol. Condensation is stopped when a molecular weight of 10,000–13,000 is reached. Insoluble polyurethanes, however, are prepared from diisocyanates such as tetramethylene diisocyanate, hexamethylene diisocyanate, octamethylene diisocyanate and linear diols with hydroxyl end groups, e. g. 1,3-propanediol, 1,4-butanediol, 1,6-hexanediol, 1,10-decanediol. Hetero-atoms such as —O— or $N(CH_3)_2$— groupings should be excluded. The molecular weight of insoluble polyurethanes useful in the process of the invention may range from 12,000–20,000.

As solvents all conventional solvents may be employed for preparing the stoving lacquers of the invention, more specifically, formamide, dimethylformamide, acetamide and low molecular weight alcohols are useful. Furthermore, mixtures of alcohols such as methanol or chloroethanol, with chlorinated aliphatic hydrocarbons such as methylene chloride, chloroform, carbon tetrachloride, ethylene trichloride and ethane tetrachloride have proven particularly suitable media.

For the preparation of surface coatings from the stoving lacquers of the invention any conventional process may be utilized. In a specific embodiment of the invention the fine-grained insoluble linear polyurethanes are suspended in solutions of polyurethanes which are soluble in organic solvents or solvent mixtures so that dispersions are formed in which the solids content of the dispersed component is 15 to 40%, the dispersions are then applied to the surfaces of the articles to be covered, preferably by being sprayed thereon by a spray gun or by dipping, and then allowed to dry. The surface to be coated is cleaned by sand-blasting prior to the treatment. The plastic dispersion may be applied once or several times according to the thickness required for the layer. After drying, the articles are stoved, preferably in an inert oven atmosphere. The stoving time depends on the size of the articles, while the stoving temperature employed is chosen with reference to the polyurethanes being used at the time, and is preferably 5 to 10° C. higher than the melting point of these polymers, i. e. 125 to 250° C. A table of melting points is given in Angew. Chem. 59, 261 (1949).

The following example serves to illustrate the invention without in any way limiting it:

Example

A soluble polyurethane is prepared from butane-1,3-diol and hexane-1,6-diisocyanate by causing about 98% of the equivalent amount of isocyanate to flow into the diol heated to 60° C., the temperature rising to 190 to 200° C. 40 parts by weight of a powdery polyurethane are suspended in a solution of 7 parts by weight of this polyurethane in 93 parts by weight of a mixture of equal parts by volume of methanol and tetrachloroethane; the powdered polyurethane is formed in accordance wtih the melting process described above from a mixture of 75 mol percent of butane-1,4-diol and 25 mol percent of methyl hexane-1,6-diol by reaction with hexane-1,6-diisocyanate and subsequent grinding with deep-cooling. After being applied to the steel plate and stoved at 170 to 180° C., this polyurethane suspension produces good adhering and comparatively soft coatings.

While the above description points out the preferred embodiments of the invention, it is to be understood that departures may be made therefrom within the scope of the invention as described and claimed.

What is claimed is:

1. A lacquer comprising an organic solvent soluble linear polyurethane prepared by reacting an organic aliphatic diisocyanate with a glycol selected from the group consisting of a glycol in which the hydroxyl groups are attached to the beta and omega carbon atoms and a glycol in which the hydroxyl groups are attached to the carbon atoms next adjacent to the terminal carbon atoms dissolved in an organic solvent therefor, and particles of a linear polyurethane prepared by reacting an organic aliphatic diisocyanate with a glycol in which the hydroxyl groups are attached to the alpha and omega carbon atoms and insoluble in said solvent.

2. The lacquer of claim 1 in which said soluble polyurethane is prepared by reacting butane-1,3-diol with hexane-1,6-diisocyanate.

3. The lacquer of claim 1 in which said insoluble polyurethane is prepared by reacting butane-1,4-diol with hexane-1,6-diisocyanate.

4. The lacquer of claim 1 in which said organic solvent is a mixture of methanol with a chlorinated aliphatic hydrocarbon.

5. A lacquer comprising from about 1 percent to about 20 percent by weight of an organic solvent soluble linear polyurethane prepared by reacting an organic aliphatic diisocyanate with a glycol having one of its hydroxyl groups attached to a terminal carbon atom and the other hydroxy group attached to a carbon atom adjacent the other terminal carbon atom dissolved in an organic solvent therefor, and from about 15 to about 40 percent particles of a linear polyurethane prepared by reacting an organic aliphatic diisocyanate with an alpha, omega dihydroxy alkane and insoluble in said solvent.

6. A method for coating surfaces comprising applying to the surface a lacquer comprising an organic solvent soluble linear polyurethane prepared by reacting an organic aliphatic diisocyanate with a glycol having one of its hydroxyl groups attached to a terminal carbon atom and the other hydroxy group attached to a carbon atom adjacent the other terminal carbon atom dissolved in an organic solvent therefor, and particles of a linear polyurethane prepared by reacting an organic aliphatic diisocyanate with an alpha, omega dihydroxy alkane and insoluble in said solvent, drying, and therafter baking the resulting dried coating.

7. Process in accordance with claim 6 in which said insoluble polyurethane is prepared by reacting butane-1,4-diol with hexane-1,6-diisocyanate.

8. Process in accordance with claim 6 in which said soluble polyurethane is prepared by reacting butane-1,3-diol with hexane-1,6-diisocyanate.

9. Process in accordance with claim 6 in which said solvent is a mixture of methanol with a chlorinated aliphatic hydrocarbon.

References Cited in the file of this patent

UNITED STATES PATENTS 2,531,392     Breslow  ---------------- Nov. 28, 1950